C. L. KENNICOTT.
WATER PURIFYING APPARATUS.
APPLICATION FILED MAY 28, 1908.

900,286.

Patented Oct. 6, 1908.
5 SHEETS—SHEET 3.

Witnesses:
John Enders
Chas H Buell

Inventor:
Cass L. Kennicott.
By Dyrenforth, Lee, Chritton & Wiles
Attys.

C. L. KENNICOTT.
WATER PURIFYING APPARATUS.
APPLICATION FILED MAY 28, 1908.
900,286.
Patented Oct. 6, 1908.
5 SHEETS—SHEET 4.
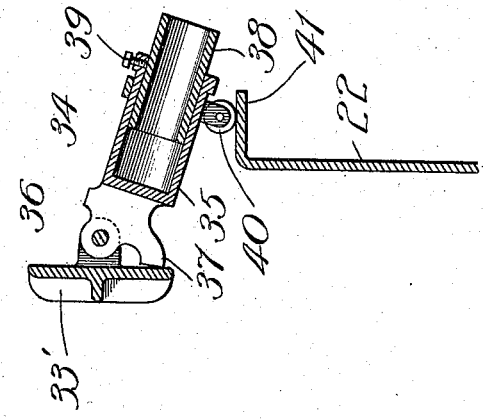
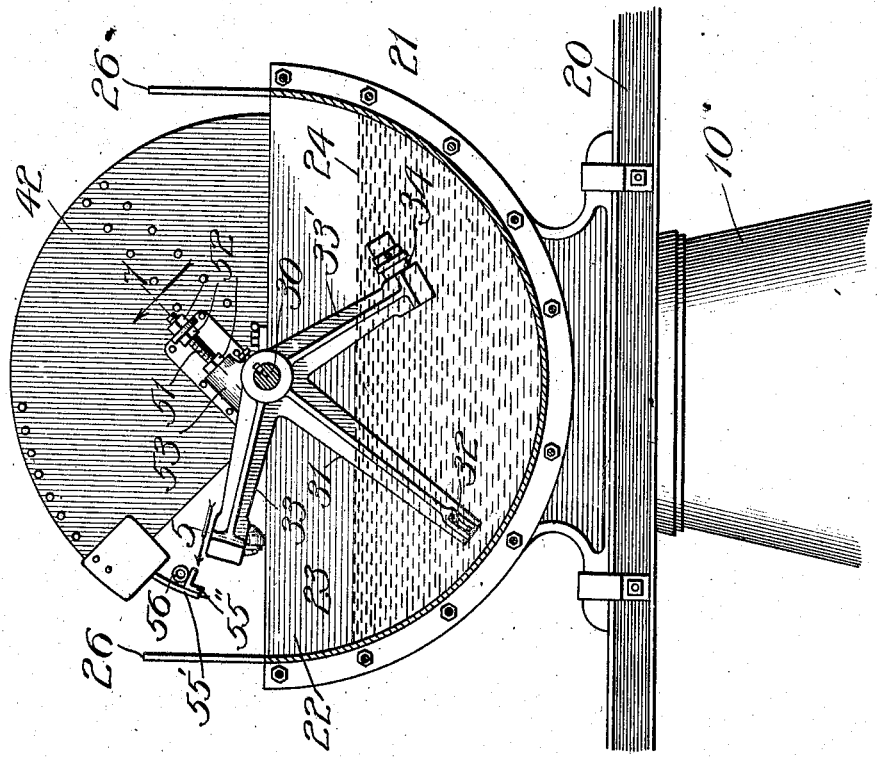
Witnesses:
John Enders
Chas H. Buell
Inventor:
Cass L. Kennicott.
By Dyrenforth, Lee, Chritton & Wiles
Attys.

C. L. KENNICOTT.
WATER PURIFYING APPARATUS.
APPLICATION FILED MAY 28, 1908.
900,286.
Patented Oct. 6, 1908.
5 SHEETS—SHEET 5.
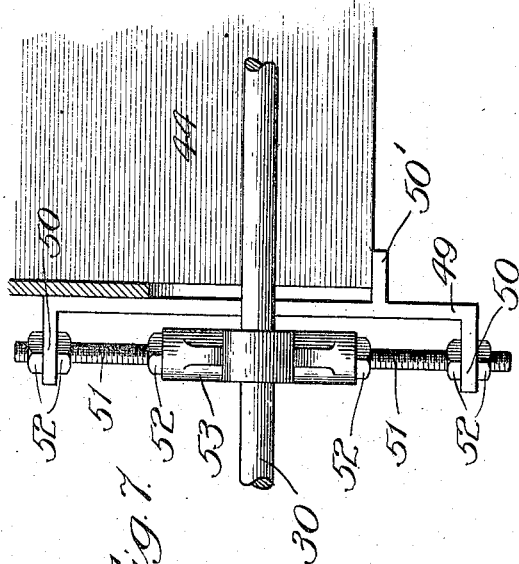
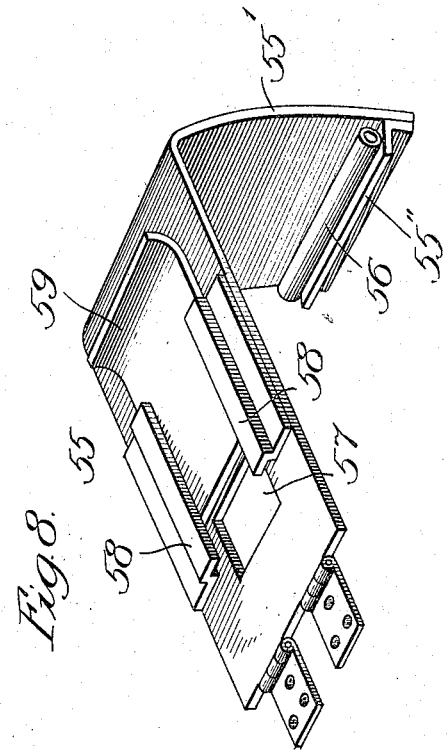
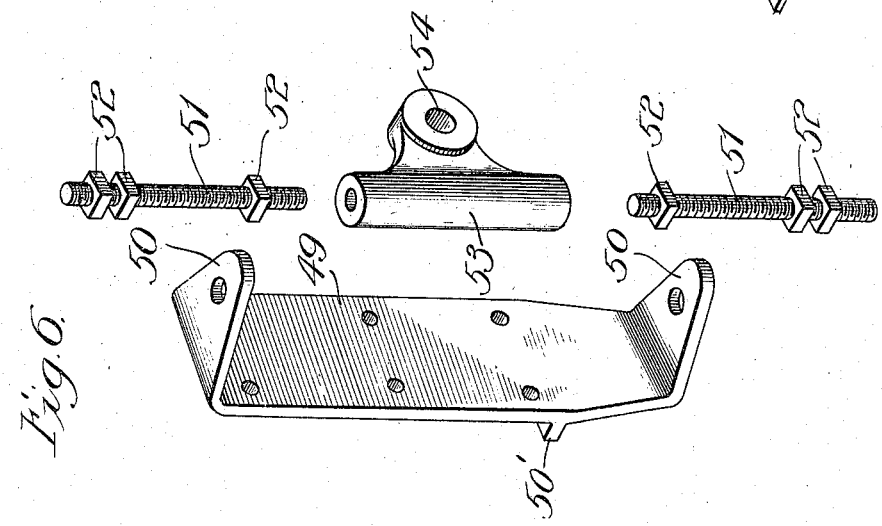
Witnesses:
John Enders
Chas. H. Buell.
Inventor:
Cass L. Kennicott.
By Dyrenforth, Lee, Chritton & Wiles,
Attys.

UNITED STATES PATENT OFFICE.

CASS L. KENNICOTT, OF CHICAGO HEIGHTS, ILLINOIS, ASSIGNOR TO KENNICOTT WATER SOFTENER CO., OF CHICAGO, ILLINOIS, A CORPORATION OF ILLINOIS.

WATER-PURIFYING APPARATUS.

No. 900,286.   Specification of Letters Patent.   Patented Oct. 6, 1908.

Application filed May 28, 1908. Serial No. 435,429.

*To all whom it may concern:*

Be it known that I, CASS L. KENNICOTT, a citizen of the United States, residing at Chicago Heights, in the county of Cook and State of Illinois, have invented a new and useful Improvement in Water - Purifying Apparatus, of which the following is a specification.

My invention relates to improvements in that feature of a water-purifying apparatus which serves for automatically proportioning the feed of the chemical solution employed to the raw water to be treated by it, and which feature involves what is known as a tilting receptacle or tipping-box interposed in the flow of the raw water to the precipitating or settling tank.

Figure 1:
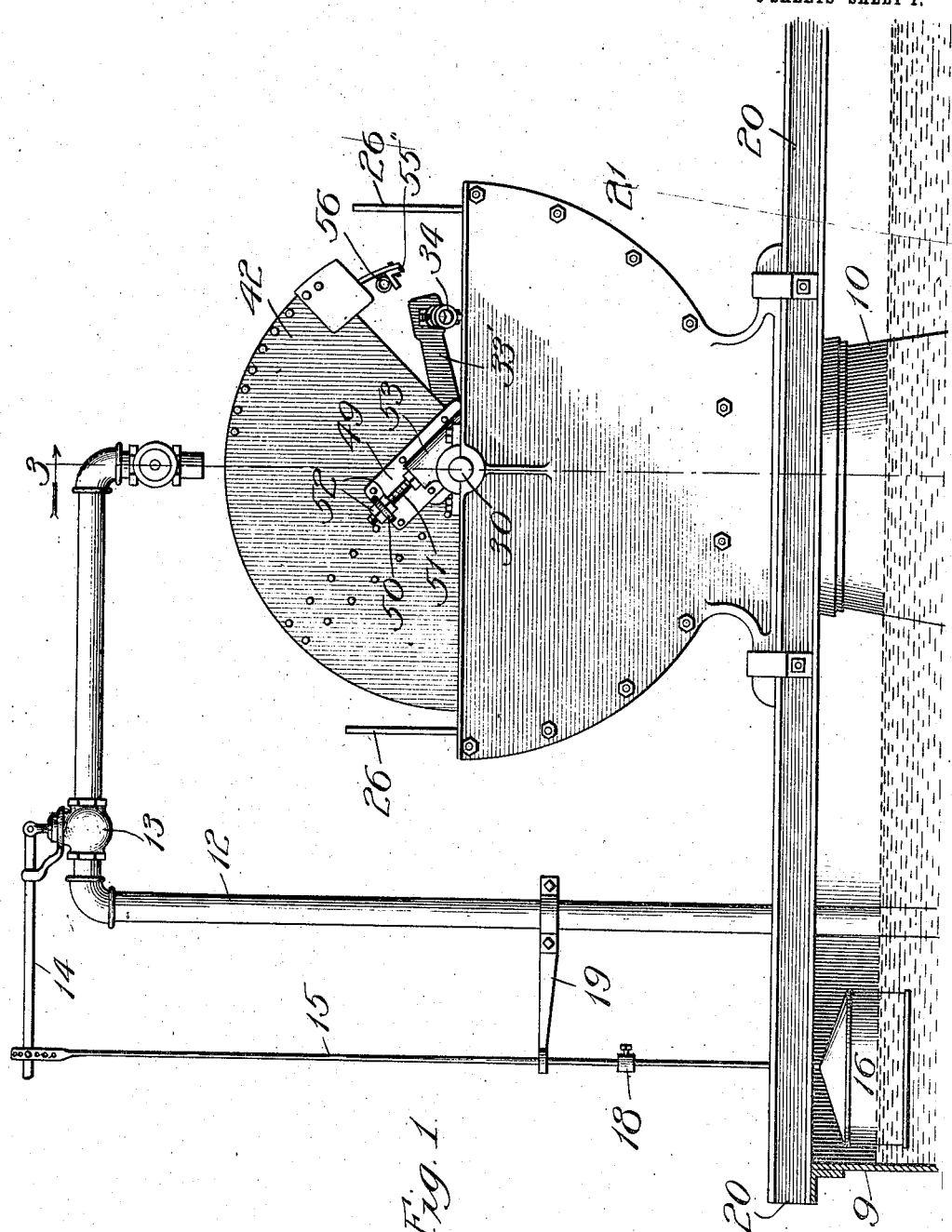
Figure 2:
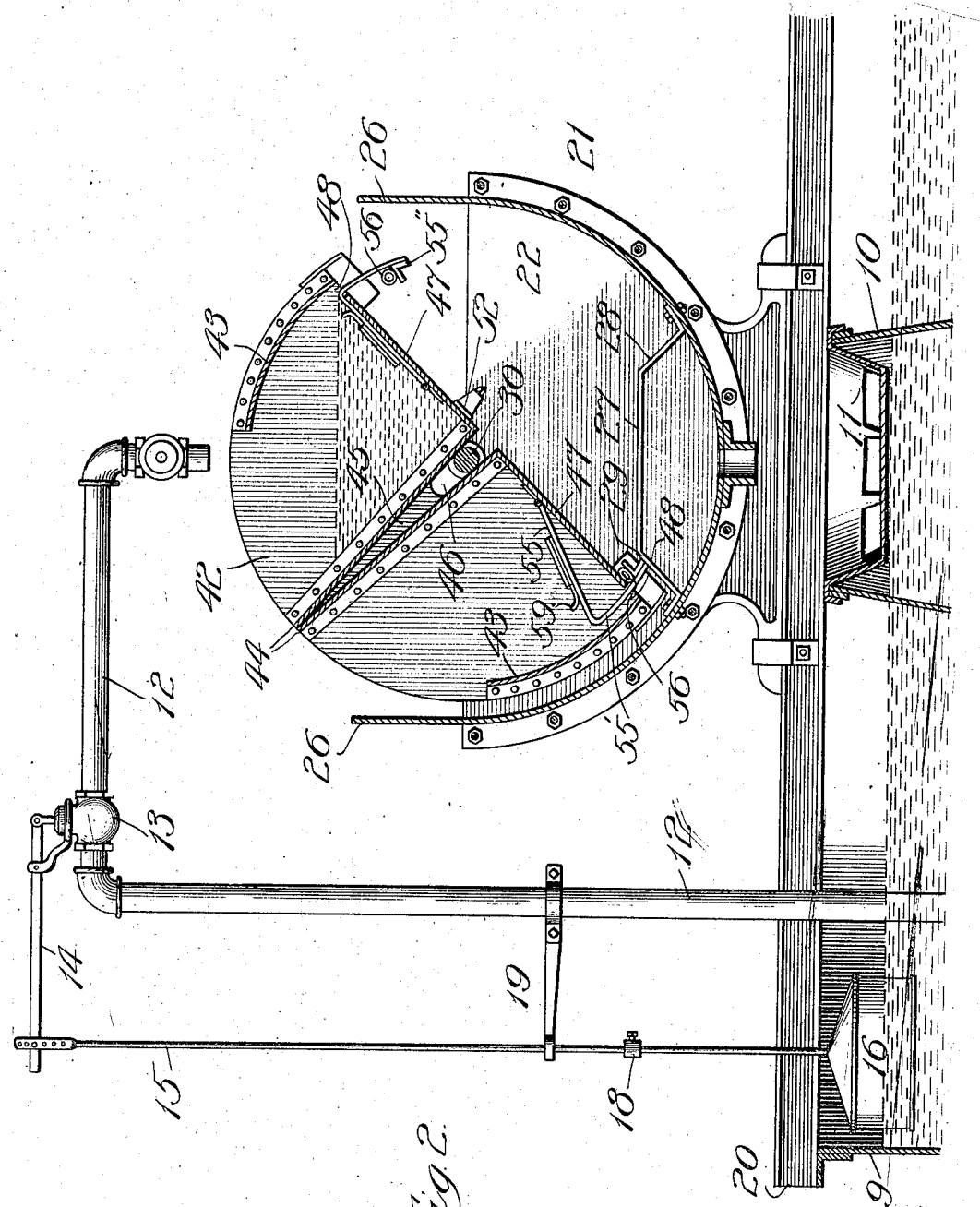
Figure 3:
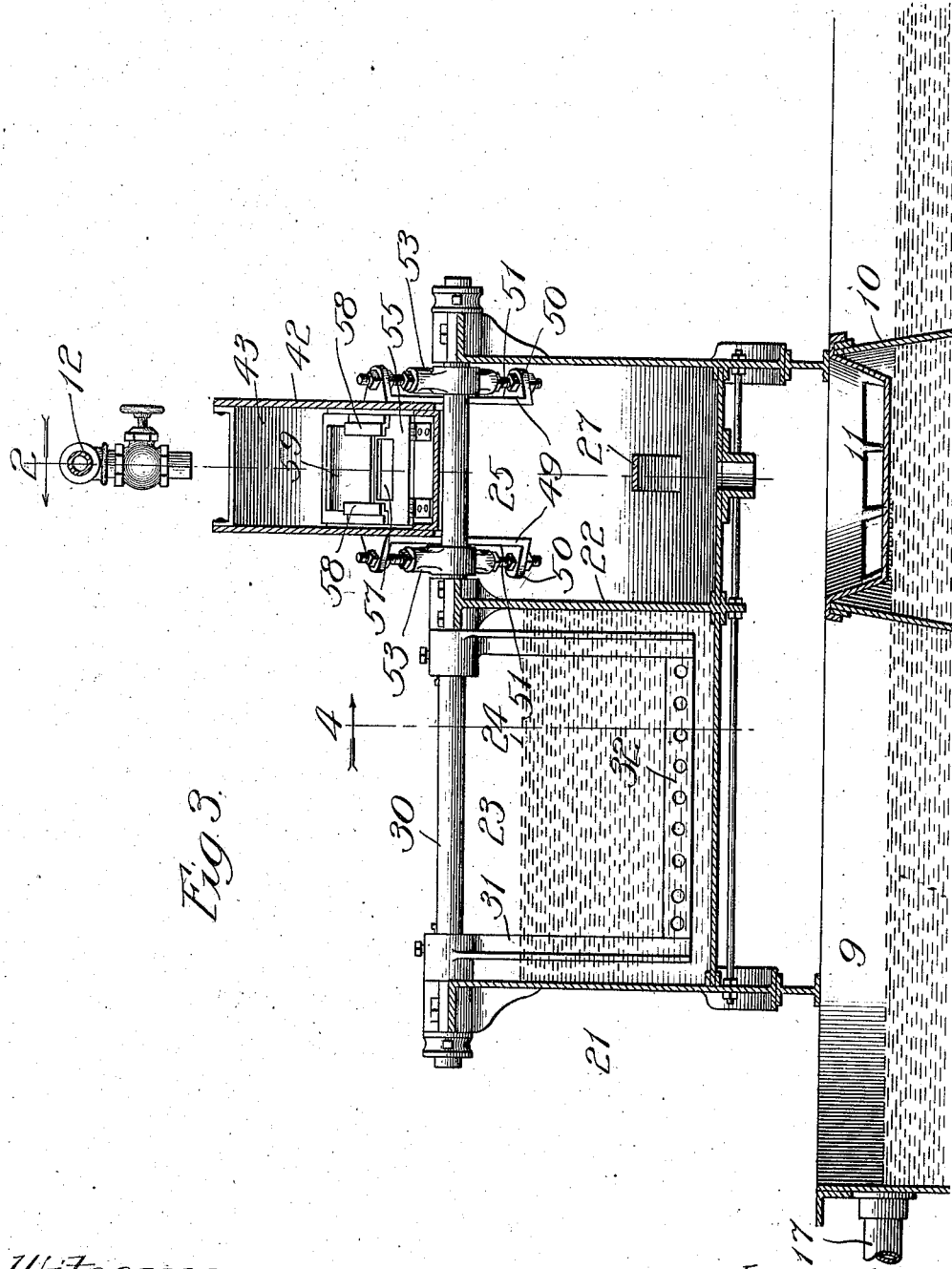

In the accompanying drawings, Figure 1 shows my improved device by a view in side elevation surmounting the precipitating tank, of which the upper portion is shown in section; Fig. 2 is a section taken at the line 2 on Fig. 3 and viewed in the direction of the arrow; Fig. 3, a section taken at the line 3 on Fig. 1 and viewed in the direction of the arrow; Fig. 4, a section taken at the line 4 on Fig. 3 and viewed in the direction of the arrow; Fig. 5, an enlarged sectional view showing my improved construction of adjustable solution-feeding cup; Fig. 6, a perspective view of details for adjusting the tipping-box on its support; Fig. 7, a broken enlarged section taken at the line 7 on Fig. 4 and viewed in the direction of the arrow, and Fig. 8, an enlarged perspective view of one of the two similar shock-absorbing wings provided in the tipping-box.

In the precipitating tank 9 is shown the downtake-conduit 10 at the upper end of which is supported a basket-like distributer 11 having an imperforate bottom and open sides through which to permit the discharge into the tank; and the raw-water supply-pipe 12 is represented rising through the tank and as extended horizontally to discharge at its depending nozzle above the center thereof, the extension containing a shut-off valve, indicated at 13, connected with one end of a lever 14 near its fulcrum; the opposite end of the lever having adjustably connected with it a depending rod 15 carrying on its lower end, in the tank, a float 16 for regulating, in a usual manner, the discharge from the pipe 12 by the level of the water in the tank, which is shown to be provided with an overflow at 17. A stop 18, adjustably secured on the rod, is adapted to engage a bracket 19 extending into the path of the stop to prevent undue rise of the float.

On beams 20 supported upon the circumferentially flanged open top of the tank 9 is supported and fastened the vessel 21, shown of the preferred general semicylindrical shape, with a partition 22 dividing it into a larger compartment 23 for containing the chemical solution, the level of which is indicated at 24, and a smaller compartment 25, forming the mixing chamber for the chemical and the raw water to be treated by it, the front and rear walls of this chamber being shown somewhat extended, at 26, for the purpose hereinafter explained. On the base of the compartment 25 and extending transversely thereof is fastened a bar 27 bent in a manner to present inclined shoulders at its ends forming the buffers 28 and 29 for limiting the movements of the tipping-box hereinafter described. A rock-shaft 30 is journaled in suitable confining bearings centrally on the upper ends of the vessel 21 and partition 22 and carries in the compartment 23 a stirrer 31 for the solution, that shown comprising arms depending from the shaft and connected at their lower ends by a perforated paddle-bar 32. The shaft also carries to extend from it at an angle to each other rigid arms 33 and 33', each carrying on its free end a hinged cup 34 of peculiar construction forming a feature of my invention. The cup consists of a tube 35 rigidly united with one of the members of the hinge 36 connecting it with its carrying arm, which member is formed into a stop 37 to abut against the arm and limit the extent of turning of the cup in emptying itself; and a tubular extension 38 telescoping the outer end of the tube 35 and adjustable therein for varying the capacity of the cup, a set-screw 39 being provided for fastening the extension in adjusted position. On the side of the tube 35 adjacent to the partition 22 is provided an anti-friction guide-roller 40 adapted to ride with the motion of the rock-shaft against the surface of the partition and upon the horizontal flange 41 formed on its upper edge, to enable the cup to turn on its hinge and discharge its contents into the mixing-chamber 25.

The tipping-box 42 is of the ordinary general construction, involving a scoop-like receptacle divided centrally between its ends by a partition into two compartments. In the present case this box is shown of semicircular shape as to its ends, between which extend the arc-shaped sides 43 and the dividing partition 44 shown to be formed of two inwardly-diverging members affording between them a space 45, registering with the inner-end portion of which is provided, in each box-end, a slot 46, the shaft 30 extending through these end-slots; and the sides 43 form filling-openings between their outer ends and the partition; while between their inner ends and the opposite corresponding end of the partition extend the sections forming the bottom 47 provided at their outer ends with the similar discharge-openings 48. For adjustably supporting the tipping-box on the rock-shaft means are provided shown in detail in Fig. 6. On each end of the box is riveted or otherwise fastened to the outer face thereof, a clip 49 having the ends bent to extend at right-angles to its body-portion and formed into aliningly-perforated bearing-ears 50 for a screw 51; and from the back of the clip extends a rib 50' to bear against the base of the adjacent portion of the box-bottom 47 as a reinforcement. Between the ears 50 extends a sleeve 53 carrying a lateral bearing 54 through which the rock-shaft passes, these sleeves thus affording the medium of support of the tipping-box on the shaft; and the screw 51 works in the sleeve, with its bearings in the ears 50, and carries nuts 52, as shown, for fastening the box in any position to which it may be adjusted by turning the screws in their bearings to raise or lower the box, to the extent permissible by the slots 46, on the shaft 30, thereby to decrease or increase the weight of water in the box for effecting its tipping movement.

The principal feature of my improvement consists in means for taking up the shock of the encounter of the tipping-box with the arresting abutments. To this end I provide on the base of each compartment in the box a similar wing 55 hinged at one end to the compartment-bottom and bent to an angle at its opposite end to protrude through the respective discharge-opening 48, this bent section 55' being provided on its inner face, near the extremity thereof, with a shelf 55'' formed of an angle-iron, on which is supported a cushion 56, preferably composed of a section of rubber hose. An opening 57 is provided in the body of the wing and is flanked by guides 58 for a slide-valve 59 affording means for varying the area of the opening, to vary the resistance to the movement of the wing of the liquid in the box-compartment.

The operation is as follows: The compartment 23 being supplied with the desired solution (as of lime) and the valve 13 being open, raw water flows from the pipe 12 into the compartment of the box 42 then under the discharge-nozzle of the pipe. The weight of the water tips the box to cause it to discharge through the opening 48 of that compartment into the chamber 25, and this movement of the tipping-box rocks the shaft 30 to raise one of the cups 34 in the compartment 23 along the partition 22 to permit it, by turning upon its hinge upon reaching the flange 41, to discharge the solution, with which it became filled in the compartment 23, into the chamber 25 to mix with the water discharged therein from the tipping-box. This movement brings the other compartment of the box under the flow of raw water to tip it in the opposite direction for discharge of the water from that compartment and for emptying the contents of the other cup 34 into the mixing chamber; and these operations are continued, the mixture from the chamber 25 discharging through the opening in its bottom (Fig. 3) upon the distributer 11 from which it flows into the tank 9 for the usual purpose. As the tipping-box turns the wing 55 in the discharging compartment thereof it encounters, at its protruding end, an abutment 28 or 29 in its path (depending on the direction of turning) and the continued movement of the box cushions the wing against the body of liquid in that compartment, thereby causing it to take up the shock of the encounter with the abutment and rendering the movement of the tipping-box practically noiseless, besides saving wear on the parts; and in the rise of the wing the cushion 56 thereon encounters the under side of the bottom 47 to prevent shock and noise by the encounter. The degree of resistance of the liquid in a tipping-box compartment to the wing therein may be regulated by enlarging or decreasing the area of the opening 57 in the latter by adjusting the valve 59. The extensions of the sides of the chamber 25 afford shields against splashing over of the water discharging from the tipping-box.

What I claim as new and desire to secure by Letters Patent is—

1. In a water-purifying apparatus, the combination of a mixing-chamber provided with abutments, and a tipping-box containing compartments and supported in the path of the flow to said chamber of water to be treated and discharging into said chamber, and movable wings supported in said compartments and extending to engage said abutments in the rocking motion of said box and cushion the impact against the liquid therein.

2. In a water-purifying apparatus, the combination of a mixing-chamber provided with abutments, and a tipping-box containing compartments and supported in the path of the flow to said chamber of water to be treated and discharging into said chamber, and wings hinged in said compartments with bent protruding end-portions engaging said abutments in the rocking motion of said box, for the purpose set forth.

3. In a water-purifying apparatus, the combination of a mixing-chamber provided with abutments, and a tipping-box containing compartments and supported in the path of the flow to said chamber of water to be treated and discharging into said chamber, and wings hinged in said compartments with bent protruding end-portions engaging said abutments in the rocking motion of said box and provided with cushions for engaging the bases of said compartments, for the purpose set forth.

4. In a water-purifying apparatus, the combination of a mixing-chamber provided with abutments, and a tipping-box containing compartments and supported in the path of flow to said chamber of water to be treated and discharging into said chamber, and wings hinged in said compartments with bent protruding ends engaging said abutments in the rocking motion of said box and provided with openings, for the purpose set forth.

5. In a water-purifying apparatus, the combination of a mixing-chamber containing abutments in its base-portion, and a tipping-box containing compartments and supported in the path of flow to said chamber of water to be treated and discharging into said chamber, and wings hinged in said compartments with bent end-portions protruding through their discharge-openings to engage said abutments in the rocking motion of said box and provided with cushion-carrying seats on said end-portions and with valved openings, for the purpose set forth.

6. In a water-purifying apparatus, the combination of a solution-holding vessel having a flanged end forming a guide, a mixing-chamber adjacent to said end, a rock-shaft, an arm extending from said shaft, and a cup hinged to the free end of said arm, comprising a roller for riding against said guide and a tubular telescoping extension with means for fastening it in adjusted position.

7. In a water-purifying apparatus, the combination of a vessel containing a partition dividing it into a solution-compartment and a mixing-chamber, a rock-shaft journaled on said vessel and carrying arms in said compartment, cups on said arms provided with rollers for riding against said partition, and a compartment-containing tipping-box supported on said shaft at said chamber in the path of the flow thereto of water to be treated, for the purpose set forth.

CASS L. KENNICOTT.

In presence of—
R. A. SCHAEFER,
CHAS. E. GAYLORD.